Dec. 1, 1953  G. E. TIRRELL  2,661,239
MIST BLOWER
Filed April 15, 1949  7 Sheets-Sheet 1

Inventor
GEORGE E. TIRRELL
By Walter W. Burns
Attorney

Dec. 1, 1953  G. E. TIRRELL  2,661,239
MIST BLOWER
Filed April 15, 1949  7 Sheets-Sheet 2
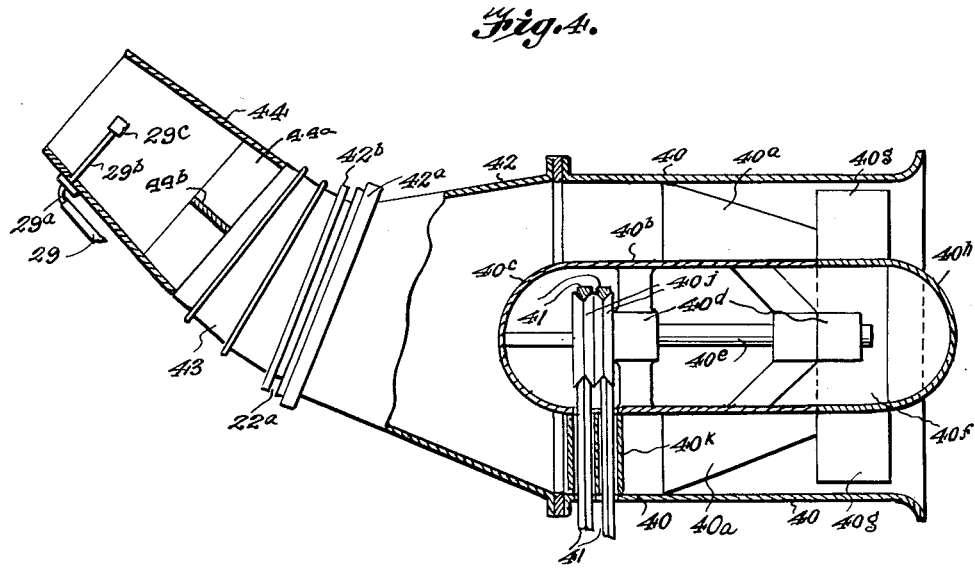
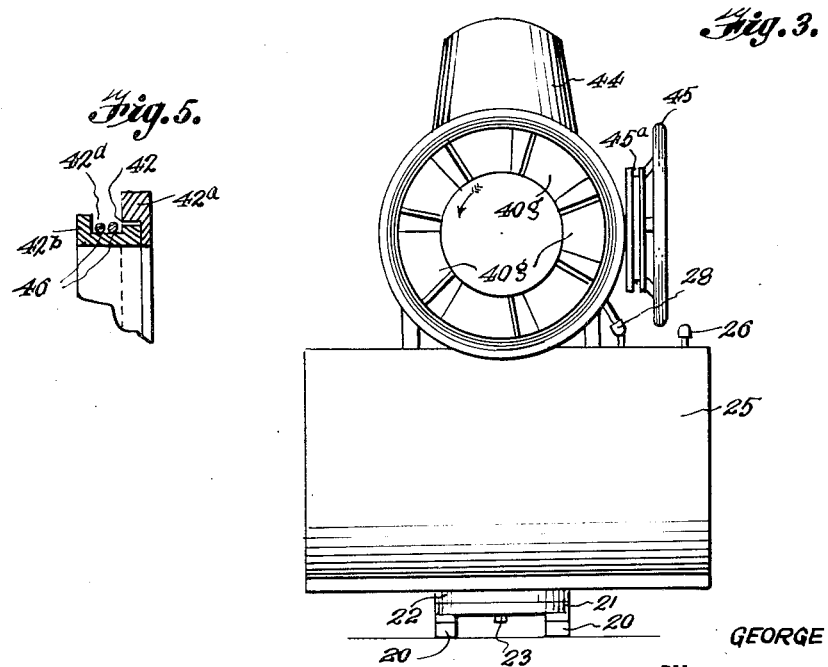
INVENTOR.
GEORGE E. TIRRELL
BY Walter W. Burns
Attorney

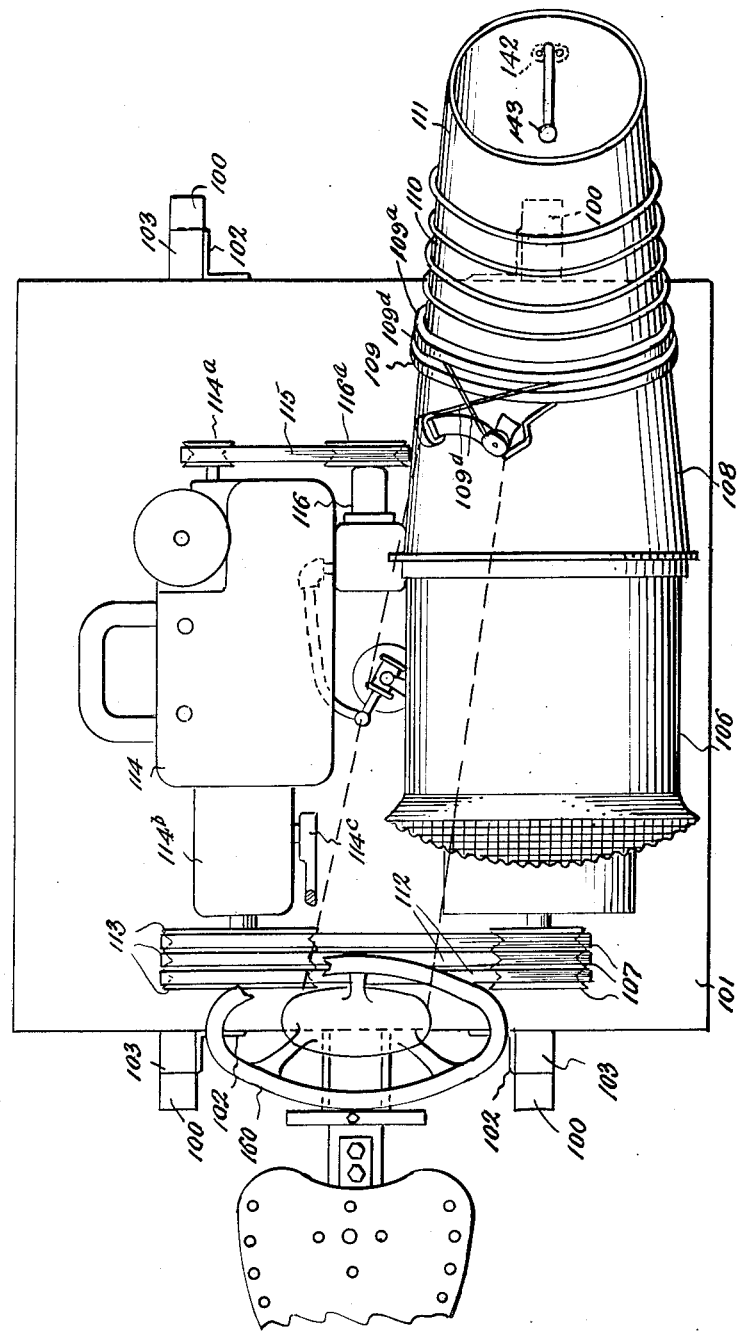

Dec. 1, 1953 G. E. TIRRELL 2,661,239
MIST BLOWER
Filed April 15, 1949 7 Sheets-Sheet 4
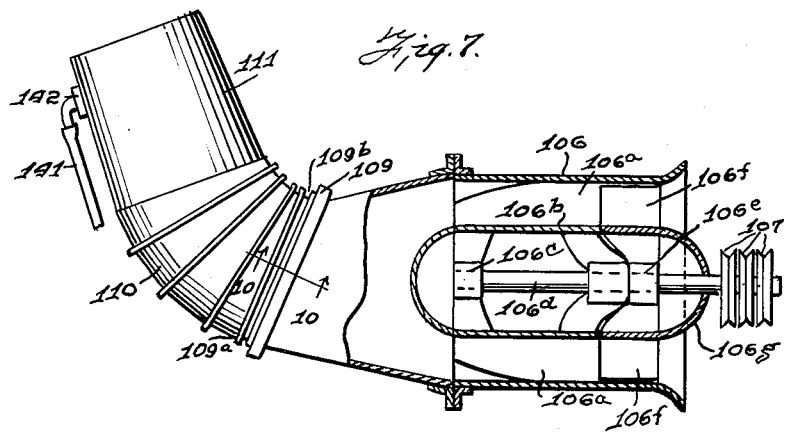
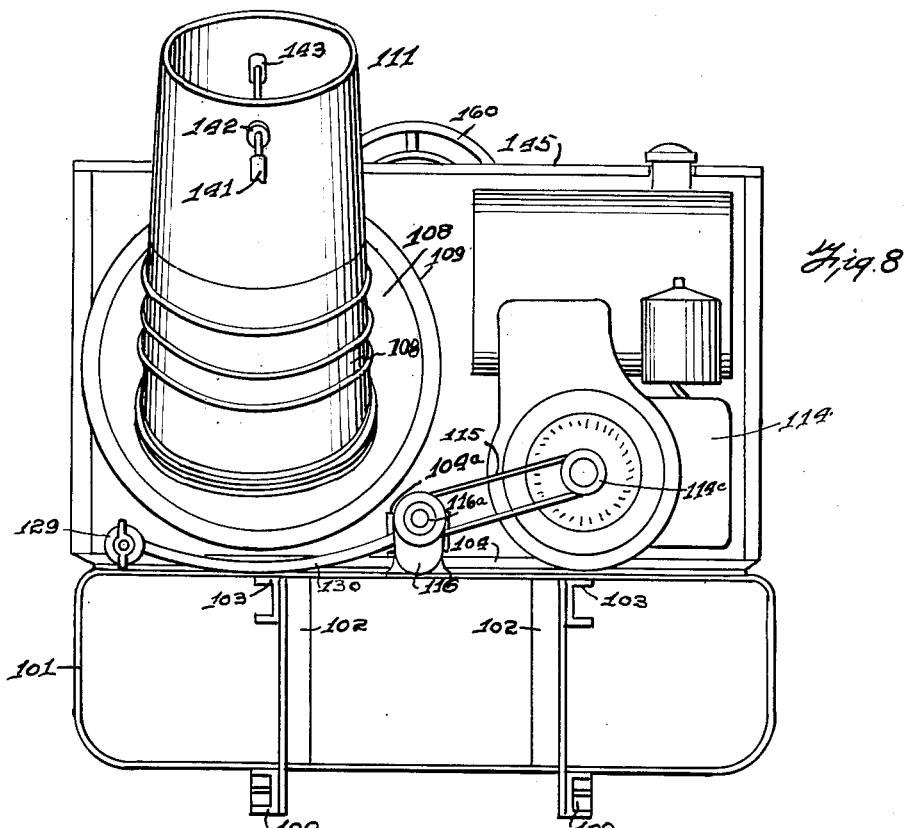
INVENTOR.
GEORGE E. TIRRELL
BY Walter W. Burns
Attorney Dec. 1, 1953 G. E. TIRRELL 2,661,239
MIST BLOWER
Filed April 15, 1949 7 Sheets-Sheet 5
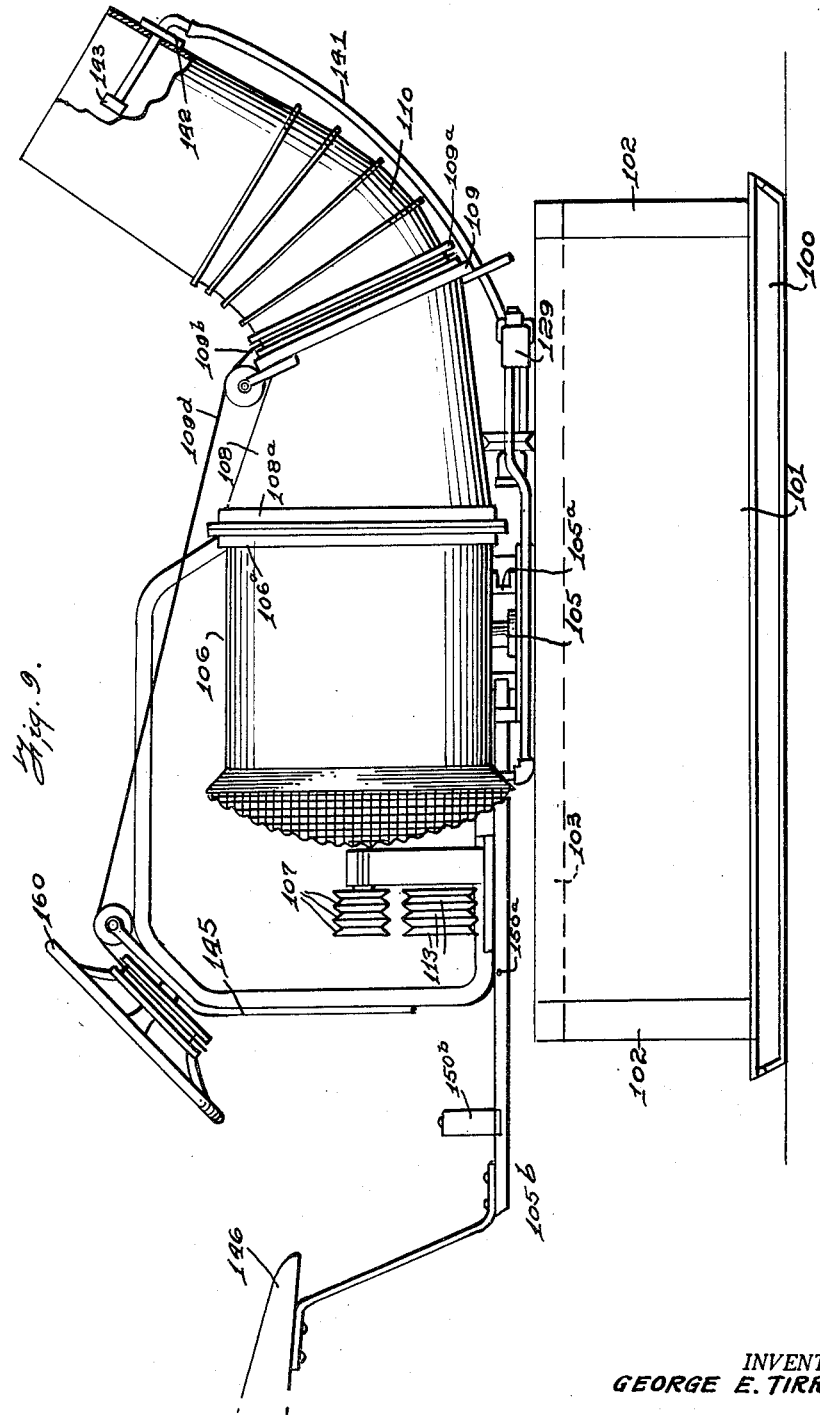
INVENTOR.
GEORGE E. TIRRELL
BY Walter W Burns
Attorney Dec. 1, 1953
G. E. TIRRELL
2,661,239
MIST BLOWER
Filed April 15, 1949
7 Sheets-Sheet 6
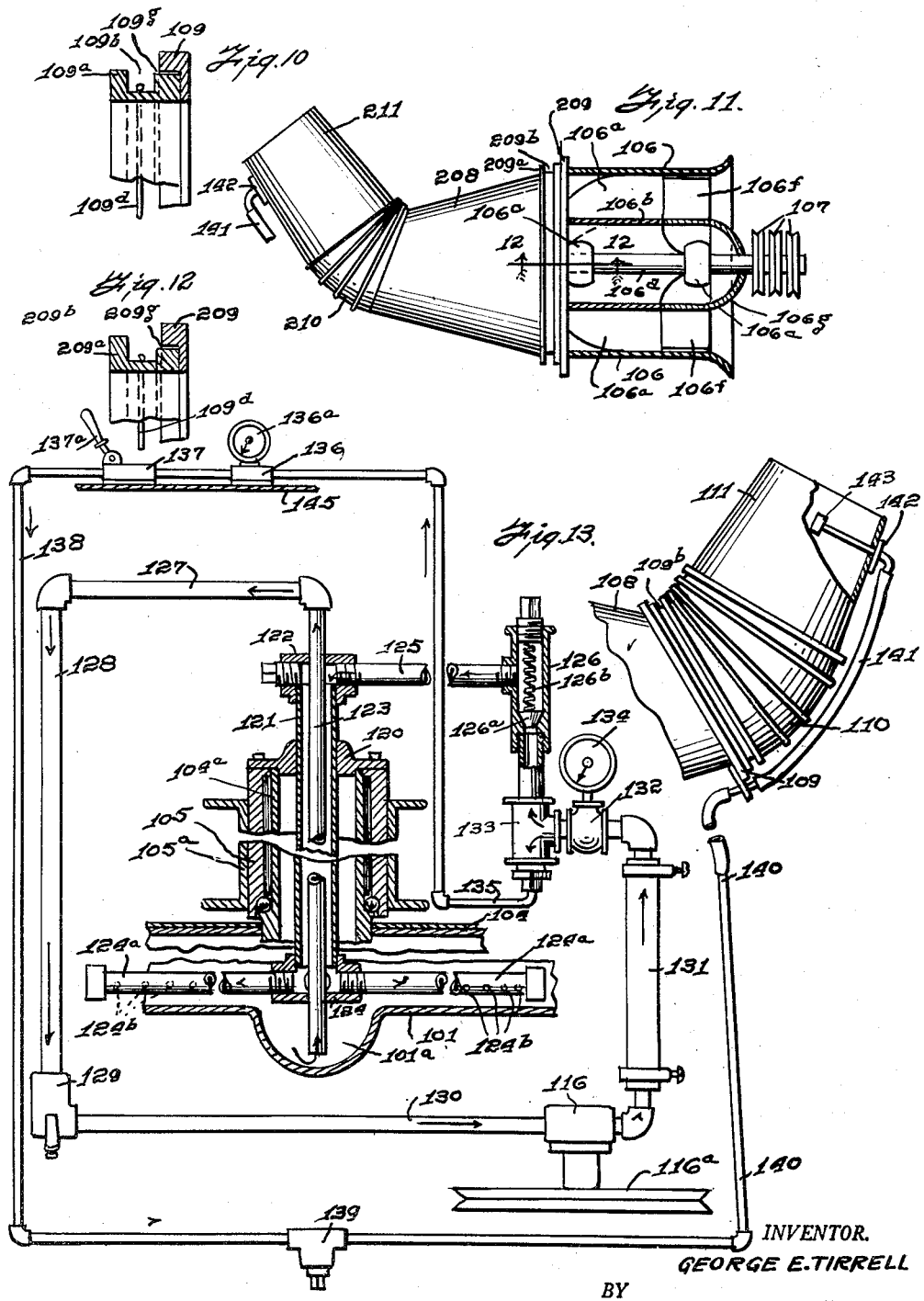
INVENTOR.
GEORGE E. TIRRELL
BY
Attorney

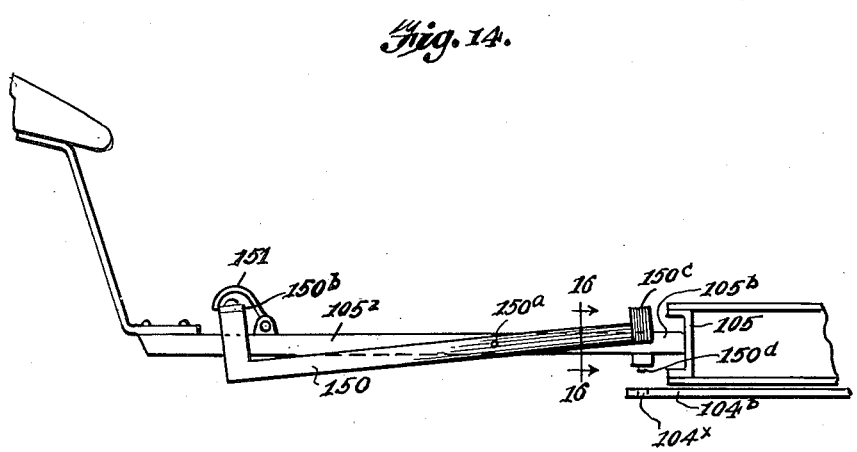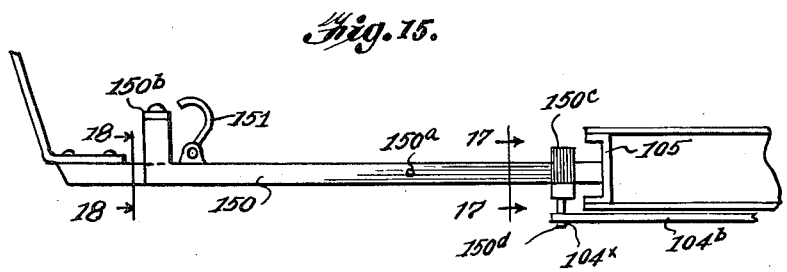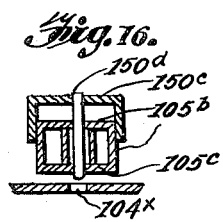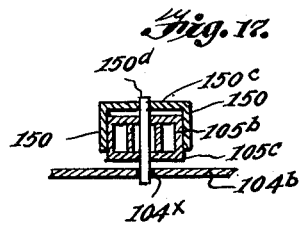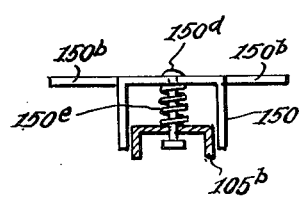

Patented Dec. 1, 1953

2,661,239

UNITED STATES PATENT OFFICE 2,661,239

MIST BLOWER

George E. Tirrell, Greenfield, Mass., assignor to A. B. Farquhar Company, York, Pa., a corporation of Pennsylvania Application April 15, 1949, Serial No. 87,811

5 Claims. (Cl. 299—42)

This invention relates to spraying machines and has particular relation to mist blowers with which it is desired to deliver a mist, for example, to the topmost branches of high trees with as little waste of the liquid as possible.

In order to deliver mist to the top branches of tall trees effectively, it is necessary to have a high nozzle discharge velocity for the air which carries the mist. It is also necessary to have a large volume of air to produce the desired results with a minimum of liquid and power outlay.

The primary object of the invention is the production of an improved mist blower for the destruction of pests such as insects and injurious bacteria as found in orchards, field crops, shade trees, rubbish heaps and public places.

Another object of the invention is the provision of an improved mist blower, wherein air is compressed in a tubular member and is then turned to the desired direction and released while retaining the mass of air and mist as a swift moving column with a minimum of internal disturbance.

Still another object of the invention is the provision of an improved mist blower wherein the air is, as a whole, moved axially while being compressed, is then put through a reducing passage to reduce its cross section and at the same time increase its velocity, after which it is released through a slightly tapered air nozzle to the atmosphere.

Another and further object of the invention is the bringing together of elements in a mist blower which will move air about a straight axis while it is being compressed and its cross section reduced, to increase its velocity and pressure, and to then turn it in the desired direction and release it to atmosphere with a minimum of internal disturbance.

A still further object of the invention is the provision of a mist blower having an open-ended wind tube with compression and straightening means, attached to a reducing section having a general shape of a truncated cone with the plane of the outlet at an angle to the axis and with an air nozzle rotatively secured to the outlet in a manner to give varying directional delivery of air from the nozzle.

Another and still further object of the invention is the provision of such a mist blower mounted on a liquid supply tank for rotation about a vertical axis with a connection through the pivot member to the liquid intake to the mist blower.

Another and still further object of the invention is the provision of a mist blower wherein a relatively stationary tank is provided for a liquid supply, with a hollow pivot centrally located on the tank and an air compressing and liquid pump means and motor mounted to rotate about the hollow pivot with an inlet connection from the tank to the liquid pump and a by-pass connection from the pump to the tank, both connections passing through the hollow pivot.

Other and further objects of the invention will be apparent to those skilled in the art from a reading of the complete specification and claims.

Referring to the drawing wherein are illustrated embodiments of the invention:

Fig. 3 is a rear view of the structures shown in Figs. 1 and 2.

Fig. 4 is a sectional view of the wind tube, reducing section, elbow and tapered nozzle.

Fig. 5 is a detail view on the line 5—5 of Fig. 1.

Fig. 6 is a plan view of another form of the invention.

Fig. 7 is a sectional view of the wind tube of Fig. 6 showing the shorter wind tube axis and with the drive means located outside of the wind tube.

Fig. 8 is a front view of the structure shown in Figs. 6 and 7.

Fig. 9 is a view of the right side of the form illustrated in Figs. 6, 7 and 8.

Fig. 10 is a detailed sectional view on the line 10—10 of Fig. 7.

Fig. 11 is a modified form of the structure of Fig. 7.

Fig. 12 is a detail view on the line 12—12 of Fig. 11.

Fig. 13 is a layout of the liquid supply system.

Fig. 14 is a side view of the foot operating means for the rotation locking means, with parts in released position.

Fig. 15 is a view similar to Fig. 14 but in locking position.

Fig. 16 is a detail sectional view on the line 16—16 of Fig. 14.

Figures 1, 2:
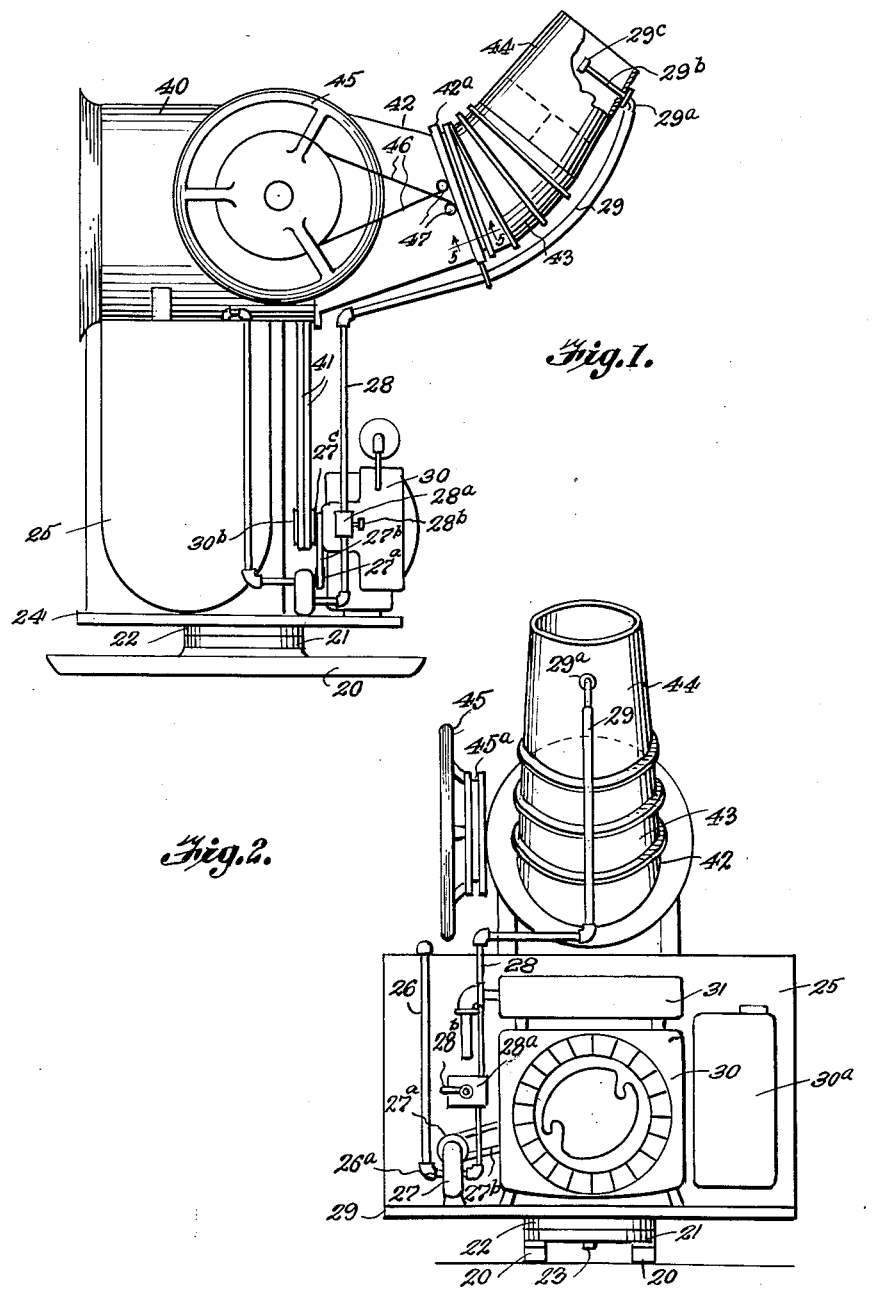
Fig. 1 is an elevational view of the right side of one form of the invention.
Fig. 2 is a front view of the structure of Fig. 1.

Fig 17. is a detail sectional view on the line 17—17 of Fig. 15.

Fig. 18 is a detail sectional view on the line 18—18 of Fig. 15.

The same reference characters refer to the same or similar parts throughout the specification and drawing.

On the skids or frame 20, is located a circular track 21 which is secured to the frame to permit the mist sprayer to rotate easily on and with a complementary circular frame 22 located above the circular track 21. A suitable pivot 23 is provided to keep the track 21 and its complementary frame 22 in proper registry to assure that the whole mist sprayer, to be described, will be easily rotated. Suitable ball or roller bearings, not shown may be provided to facilitate the free rotation of the mist sprayer. It is to be understood that the skids or frame 20 may be secured to the bed of a truck or trailer when in use in the field.

Secured to the upper frame 22 is a bed frame 24 to which the mist blower is permanently mounted. The units on the frame 24 which coact to produce the desired results are essentially a liquid tank, a pump to provide the pressure for the delivery of the liquid, the mist blower air supply means and a motor to provide power for the air supply means and the liquid pump. These parts will now be described.

Secured to the bed frame 24 is a tank 25 to which is connected a pipe 26 which leads to a suitable pumping means as the gear pump 27, to which it is connected as at 26a. The liquid is delivered from the pump 27 through the delivery pipe 28 to the flexible tube 29. This tube is connected to the jet which will be later described. The pressure of the liquid necessary at the jet will be determined by the size of the jet opening or openings and by the nature of the conditions to be met. The pressure may be from 20 pounds to 40 pounds per square inch or it may be greater or less according to the conditions to be met.

A motor 30 with its fuel tank 30a and its muffler 31 is provided to furnish the power. The gear pump 27 is provided with a shaft on which is mounted a drive V-pulley 27a on which a V-belt 27b runs to turn the pump shaft. This V-belt 27b is driven by a V-pulley 27c on the shaft of the motor 30.

To provide for the turning on and off of the liquid pressure in the pipe 29, there is provided a control box 28a which is provided with a cut-off valve 28b and suitable automatic valve-control mechanism to by-pass the liquid past the valve 28b when the pressure becomes excessive and to return the liquid to the tank. As all of this pressure control mechanism is common and well-known in the art, its details will not here be further set forth.

The wind passage and air supply means will now be described. Mounted on the top of the tank 25 is a wind passage tube 40. Within the passage 40 is a central portion which is occupied by the mechanism for propelling the air through the tube. Spaced around the outer wall of the wind tube 40, there are deflector blades 40a which are secured to the outer wall and serve to straighten the air current which is set in motion by the air propelling means to be described. In addition to the function as an air current straightening means, the blades serve to support the inner shell 40b which has an air-flow end 40c. The inner shell 40b is stationary and supports the bearings 40d. Mounted in the bearings 40d is a shaft 40e which has mounted on its rear end a hub 40f which carries spaced fan blades which I term of the compression type. However, this term is a functional term and is meant to describe blades which are very efficient and which are only sufficiently long to reach from the hub to a cylinder just short of the cylindrical inner surface of the tube 40. These blades are designated 40g. In practice, it has been found to be efficient to have seven of the blades 40g and nine of the deflector current-straightening blades 40a. Beyond the propeller blades 40g at the end of the hub 40f is an air flow end 40h which rotates with the propeller hub 40f in the inlet of the air tube.

On the end of the shaft 40e opposite the end 40h, are V-pulleys 40j which carry the driving V-belts 41. These belts 41 are driven from the pulleys 30b which are secured on and rotate with the shaft of the motor 30. In the bottom of the wind tube 40 there is a suitable opening to permit the V-belts 41 to reach the V-pulleys 40j to drive them. Suitable hollow struts 40k are provided to give the air an air-flow movement past the V-belts 41.

At the delivery end of the wind tube 40 is secured a reducing section 42 which reduces the cross section of the wind passage. As the air passes the delivery end of the wind tube 40 and enters the reducing section and the cross section of the air passage is made smaller, it is clear that there will be an increase in the velocity of the air as it approaches the outlet of the reducing passage.

A feature of this reducing section passage is that I preferably have the outlet in a plane which is not normal to the axis of the wind passage. While the reducing section is illustrated as being fixed to the wind tube section 40 and is not rotatable with relation thereto, it is to be understood that this is not necessarily so.

A suitable angle for the axis of the outlet opening of the reducing section to be placed with relation to the axis of the wind tube 40 has been found to be about 22½°.

It is to be understood that the wind tube 40 and the parts contained therein are not a part of this invention per se, but are described as illustrative of a type of axial-flow pressure producing means.

Secured to the outlet opening of the reducing section 42, is a receiving ring 42a. In this ring in the embodiment illustrated (Fig. 5) is secured a rotating direction ring 42b to enable the operator to give an angularity to the air delivery, with relation to the axis of the wind passage 40. This angularity of the delivery with relation to the axis of the wind tunnel is desirable for the reason that it has been found that the machine will work better if kept in a horizontal position for the reason that the bearings of the motor 30 will last longer in this position and for the additional reason that the intake to the wind tube in this position is more easily kept unobstructed.

The nozzle section which is attached to the rim 42a may be made in two portions, one in the form of an elbow 43 and the other in the form of a slightly tapered nozzle 44. The elbow portion 43 which I have used successfully with a 45° turn may be slightly tapered or may be made of a uniform cross section. The end of the elbow 43 which is attached rotatively to the reducing section 42, is rigidly secured to the ring 42b which rotates in the correspondingly shaped slot 42 in the ring 42b. In the periphery of the ring 42a is a cylindrical groove 42d to receive the rotating cable to be described. In practice, with a wind tube of 18″ overall diameter, the outlet of the reducing section 42 has been made 12″. The nozzle portion, exclusive of the elbow 43, has been made of a 12″ length on its axis with a reduction of from 12″ at its intake to 11″ at its outlet.

It has been found that with a construction made on the proportions stated, an air delivery has been produced at the nozzle opening with a practically uniform outlet pressure throughout the area within a circle ¼" inside the shell of the nozzle. This uniformity in the pressure at the point of delivery into the atmospheric air is very desirable in order that a minimum of interference may be met with the atmosphere. This results in an effective carrying power of the air to carry the mist to a height of 100 feet or more in a quiet atmosphere.

The liquid, as already stated, is fed to the air stream from a flexible delivery pipe 29. A fitting 29*a* is provided through which the liquid is delivered to a very small pipe 29*b*, thence to a very small jet nozzle 29*c*. Here the air current takes up the liquid in small particles and as it moves through the atmosphere, the particles of mist are dispersed to all parts of the air current.

On one side of the shell of the passage 40 is rotatively mounted a nozzle-directing hand wheel 45. This hand wheel 45 is provided with a groove 45*a* in which operates a nozzle directing cable 46. The cable 46 contacts the groove 45*a* and passes over the guide pulleys 47 and around the groove 42*d* of the direction ring 42*b* of the elbow 43. By turning the hand wheel 45, the elbow 43 and the nozzle 44 may be turned about the axis of the opening in the reducing section 42 to direct the nozzle in the desired direction. In connection with the directing of the nozzle, the rotative feature of the whole machine about the pivot 23, assists the operator to point the nozzle in the desired direction.

In operation, after the motor 30 has been started, the air pressure in the air passage of the tube 40 will soon be built up to the desired degree, after which the liquid valve 28*a* is opened to start the liquid delivery to the air current. Excess pressure of the liquid will be relieved by the relief valve not shown, the excess liquid being bypassed back to the tank 25.

Another form of the invention will now be described wherein the construction of the air pressure and delivery means is substantially the same as that already described. The main differences are the arrangements for handling the liquid which, with the air under pressure produces the mist.

In this construction, the skids 100 form the support upon which the working parts and mechanisms are mounted. These skids 100 are shown as channels which extend the length of the tank 101 and support the bottom thereof. At the ends of the tank and welded or otherwise secured to the skids 100, are four uprights 102 which are secured at their upper ends to longitudinal support members 103. These support members extend through the length of the tank just below the upper plate of the tank and relieve the tank of the weight it otherwise would have to carry.

Secured to the top of the tank and supported by the support members 103 within the tank, is the swivel base 104. This swivel base comprises a top and bottom member with suitable vertical web members to provide additional strength and rigidity, with a swivel member 104*a* having a hollow interior, at the middle. This swivel member 104*a* provides for the ready pivotal movement of the mist blower as a whole and for the connection of the sprayer pump to the interior of the tank, as will be later described. Rotatively mounted on the swivel member 104*a* is the rotating frame 105. The rotating frame 105 is provided with outwardly extending channel beams 105*a* which carry all of the working parts of the mist blower.

At the right side of the rotating frame 105 is mounted the mist blower mechanism. This comprises the air passage tube 106 which is provided with the air current straightening fins 106*a*. These straightening fins are secured along their outer edges to the tube 106 and at their inner edges they carry a stationary cylindrical member 106*b* which carries the bearings 106*c*.

Carried by the bearings 106*c* is a drive shaft 106*d*. The shaft 106*d* has at its rear end, the hub 106*e* which carries the fan blades 106*f*. In practice, with a fan of 18 inches' diameter, it has been found that seven fan blades 106*f* and nine air current straightening fins 106*a* make an efficient combination. The blades 106*f* of the fan are of the compression type and are very efficient for the purposes of my construction. It will be understood that the turning of the fan tends to force the air through the passage between the cylinders 106 and 106*b* in a spiral movement. The fins 106*a* straighten the air current so that as the air reaches the outlet end of the cylinder 106 it is moving in a substantially straight axial direction.

The fan with its blades 106*f* is provided with an air flow end 106*g*. Mounted on the rear end of the shaft 106*d* are V-pulleys 107 which drive the fan as will be later described.

It will be noted that the cylinder 106 is shorter than its counterpart 40 previously described. This is made possible by the placing of the drive mechanism for the fan outside of the tube 106 as shown in Fig. 7, instead of, as shown in Fig. 4, inside the cylinder 40. The result of the placing of the drive mechanism outside the tube 106 is that with an 18″ diameter cylinder, the axial length may be shortened from 18″ to 12″. In addition, there is some improvement in the air current for the reason that the hollow struts 40*k* are omitted.

The delivery end of the tube 106 is provided with a flange 106*h* to which a companion flange 108*a* of the reducing section 108 is attached in any suitable manner. The reducing section 108 has a cross section which is reduced as the delivery end is approached. I have found that with an 18″ intake, the outlet of the reducing section 108 may, with a diameter of 12″ produce good results. The axial length of this reducing section may, with good results, be made about 12″. The reducing section outlet is preferably so placed that its axis is about 22½° to the axis of the cylinder 106. At the outlet of the reducing section 108, there is secured a receiving ring 109 which is provided with a groove 109*g* to receive a direction ring 109*a*, which is secured to the attached end of the elbow 110. The members 109 and 109*a* permit the turning of the elbow with relation to the other parts of the machine to give direction to the nozzle 111, at the delivery end of the elbow 110. The direction ring member 109*a* is provided with a groove 109*b* to receive the direction control cable 109*d* to be described.

The nozzle 111 is similar in construction and operation to the nozzle 44 already described.

Operating the V-pulleys 107 are an equal number of V-belts 112 which in turn are operated by the V-pulleys 113 on the shaft of the motor 114. The main shaft of the motor 114 operates a small V-pulley 114*a* at its forward end. At its rearward end the main shaft passes through a reduction gear box 114*b* which also contains a clutch, all of which details are not a part of the invention and are not shown in detail. The clutch within the gear box 114b is operated by a clutch lever 114c which extends to a position which is convenient for its operation by the operator.

The pulley 114a at the forward end of the main motor shaft drives a V-belt 115 which drives a V-pulley 116a of the gear pump 116. This gear pump is connected to a liquid pressure system which will now be described.

Extending through space within the hollow swivel member 104a are the connections between the gear pump 116 and the tank 101. These connections include an intake to the pump and an overflow from the pump to the tank. This latter is used as a liquid agitator as will be described.

The liquid pressure system will now be described. As already indicated, the hollow swivel member 104a is secured to and is rigid with the top of the tank 101 and the frame 105 which carries the mist sprayer and its working parts, is provided with suitable bearings on which it rotates about the swivel member 104a.

At the top of the swivel member 104a is a cover member 120 which turns with the frame 105 and the parts it carries, about the center of the swivel member 104a. Secured in the cover 120 at its center is a pipe 121 which is provided with a T fitting 122 at its upper end. Welded in an opening at the top of the T fitting is a smaller pipe 123 which extends the length of the pipe 121 and into the sump 101a of the tank 101. This inner pipe 123 is the intake pipe for the liquid pressure system. At the bottom of the pipe 121 is a cross-with-side-opening fitting 124 which is provided with a special opening at its bottom for the passage of the inner pipe 123. Extending from the four openings of the cross fitting are capped pipes 124a of sufficient length to extend almost to but short of the sides of the tank. Openings 124b are provided near the bottoms of the pipes 124a and having their axes at an angle to the vertical. This angularity is such that the openings 124b of the several radially extending pipes 124a will act on the liquid in the tank to keep it moving about the axis of the swivel member 104a to insure the agitation of the liquid.

Extending from one side of the T fitting 122 is a pipe 125 which delivers liquid to the pipe 121 from the pressure control device 126 to be later described in detail.

The intake pipe 123 conducts the liquid through the pipes 127, 128 to a strainer 129 from which the liquid is conducted through a pipe 130 to the gear pump 116. As the V-pulley 116a rotates, the gear pump forces the liquid through the pipe 131, the T fitting 132 and into the T fitting 133. A pressure gage 134 gives the liquid pressure.

When the liquid reaches the T fitting 133 it divides, one portion going through the small pipe 135, past the pressure gage T fitting 136, the manual control valve 137 with its manual control handle 137a, through the pipe 138, the strainer 139, the pipe 140, the flexible pipe 141, and the fitting 142 to the liquid nozzle 143 which is within the air nozzle 111.

The other portion of the liquid within the T fitting 133 passes to the pressure control device 126 already referred to. This fitting has a spring pressed valve 126a under the influence of the spring 126b which has a tendency to hold back the liquid being forced into the pressure device 126. As the liquid passes the valve 126a it passes through the pipe 125 and into the fitting 122, already mentioned. From here, the liquid passes downwardly around the small pipe 123 and out into the pipes 124a from which the liquid is forced through the openings 124b into the tank 101. The directional movement given the liquid within the tank 101 by the angularity of the openings 124b is always about the axis of the pivot 104a and tends to keep any suspended portion of the tank contents, in suspension in the liquid. As the mist blower as a whole is rotated about the axis of the swivel member 104a, all portions of the bottom of the tank are reached by the small streams of liquid coming from the openings 124b.

At the rear of the mist sprayer and mounted to rotate with the motor and blower mechanism, is a guard 145 upon which the pressure gage 136a and the pressure control valve 137 are mounted. At the rear of the guard 145 is mounted the operator's seat 146 which is supported from the frame member 105b which rotates with the frame 105 about the swivel member 104a.

Since the mist blower as a whole rotates freely about the axis of the swivel member and since the reaction of the air current produced against the atmosphere is considerable, it is necessary to have some means to prevent the mist sprayer from rotating when it is desired to hold it fixed. To provide for this, I install a locking means to hold the upper rotating carriage in any desired adjusted position.

Pivoted at 150a to the member 150b are a pair of lever members 150 which are connected together at their rear ends by the foot member 150b and at their forward ends by the detent supporting member 150c.

The foot member 150b is provided with a bolt 150d which passes through the member 105a and is provided with a nut to hold the parts against accidental displacement. A spring 150e surrounds the bolt 150d and normally holds the foot member 150b in its upper position. Adjacent the forward end of the lever members 150, the member 105a is provided with a cross connecting member 105c. Through the member 105a and the cross member 105c are a pair of superimposed holes. Within those holes to move vertically therein and secured to the detent supporting member 150c, is the detent member 150d. This detent member 150d, being mounted on the frame 105, swings in a circle with a center at the axis of the swivel member 104a. Its lower end is in proximity to a series of openings 104x in the top plate 104b of the swivel frame 104. The openings 104x are arranged in a circle and are sufficiently close together to provide for all of the circumferential adjustments of the swivel frame and the air nozzle 111 which may be desired.

By pushing downwardly on the rear end of the lever members 150, by placing the foot on the foot member 150b, the detent 150d may be lifted clear of the openings 104x and the whole swivel frame 105 with the elements carried thereby, may be turned to bring the air nozzle 111 to bear in the desired direction. By releasing the foot from the foot piece 150b, the spring 150e will cause the detent 150d to return to the first opening 104x with which it may come in contact.

If it is desired to lock the detent 150d in its upper position so that it cannot register with any opening 140x, it is necessary only to move the locking hook 151 over the top of the foot member 159b when the latter is in a lowered position.

In some instances, I may desire to move the nozzle angularly at the inlet to the reducing section rather than at its outlet. In such a case, I provided the receiving ring 209 at the outlet end of the air tube 106. This ring has an annular groove 209g in which a direction ring 209a is mounted for rotation. This direction ring is secured to the inlet end of the reducing section which turns with the direction ring as the latter is rotated by the hand wheel 160 and is provided with a cable groove 209b. In such a construction, the elbow member 210 is rigid with the nozzle 211 and the reducing section 208.

A direction wheel 160 is mounted on the shield 145 and is similar to the wheel 45 already described. A cable 109d is provided with suitable guide pulleys to lead the cable to the groove 109b or 209b to rotate the nozzle to give it the desired angularity.

While the illustrated embodiments have been set forth in detail in the description and drawing, it is to be understood that the disclosure is merely illustrative and that modifications and changes may be made without departing from the spirit of the invention and within its scope as claimed.

Having described my invention, what I claim is:

1. A mist blower comprising a wind tube having inlet and outlet openings, an air impeller of the axial flow type axially disposed within and between the ends of the tube and having a hub, the impeller having a shaft, a drive connection to the shaft and external to the wind tube, a power motor outside the tube and a sufficient distance from the tube entrance to avoid interference with the incoming air to the tube and operatively connected to the drive connection, a shell surrounding the shaft, substantially uniformly spaced from the wall of the tube and forming a continuation of the hub, streamlined ends for the shell and hub, straightening vanes between the tube and shell for straightening the air current flow from the impeller and located down stream of the impeller, an air outlet portion adjacent the tube outlet, an angular section for receiving the air from the outlet portion and having a tapered nozzle portion at its end, a liquid delivery jet adjacent the discharge opening of the nozzle, the spaces between the vanes and the space between the down stream ends of the vanes to the liquid delivery jet being unobstructed to thereby produce an unobstructed air current between the impeller and tube end forming an unobstructed annular current which merges beyond the streamlined shell-end to form a current of substantially uninterrupted cross section to the jet adjacent the nozzle opening.

2. A construction as set forth in claim 1 and having the outlet portion from the tube successively smaller in cross section in a down stream direction.

3. A construction as set forth in claim 1 and having its nozzle portion adjustable to various angles relative to the horizontal to deliver the mist in the desired direction.

4. A construction as set forth in claim 1 and having an angular section for receiving air from the tube and delivering the air at an angle to the tube axis, the nozzle portion being adjustable relative to the tube axis to deliver the mist at the desired angle to the horizontal.

5. A construction as set forth in claim 1 and having the wind tube, nozzle and power motor mounted for rotation about a vertical axis, the nozzle being adjustable to vary the axis of its opening with relation to the horizontal.

GEORGE E. TIRRELL.

References Cited in the file of this patent

UNITED STATES PATENTS

| Number | Name | Date |
|---|---|---|
| 555,256 | Monroe | Feb. 25, 1896 |
| 680,280 | Roesser | Aug. 13, 1901 |
| 1,012,398 | McCombie | Dec. 19, 1911 |
| 1,411,564 | Cobb | Apr. 4, 1922 |
| 1,515,476 | Greenfield | Nov. 11, 1924 |
| 1,571,467 | Cobb | Feb. 2, 1926 |
| 1,785,932 | Brown et al. | Dec. 24, 1930 |
| 1,859,567 | Knapp et al. | May 24, 1932 |
| 1,899,749 | Deutsch | Feb. 28, 1933 |
| 1,923,425 | Diederich | Aug. 22, 1933 |
| 1,933,380 | Mock et al. | Oct. 31, 1933 |
| 1,961,198 | Corley | June 5, 1934 |
| 1,986,407 | Parker | Jan. 1, 1935 |
| 1,993,635 | Towt | Mar. 5, 1935 |
| 2,132,727 | Foote | Oct. 11, 1938 |
| 2,238,120 | Launder | Apr. 15, 1941 |
| 2,512,175 | Sawyer | June 20, 1950 |
| 2,515,792 | Ofeldt | July 18, 1950 |